Nov. 15, 1955 N. B. COLEY 2,724,063

ELECTRO-MAGNETICALLY CONTROLLED START-STOP IMPULSE TIMER

Original Filed April 13, 1950 2 Sheets-Sheet 1

INVENTOR.
N. B. COLEY
BY
Forest B. Hitchcock
HIS ATTORNEY

Nov. 15, 1955 N. B. COLEY 2,724,063

ELECTRO-MAGNETICALLY CONTROLLED START-STOP IMPULSE TIMER

Original Filed April 13, 1950 2 Sheets-Sheet 2

INVENTOR.

N.B. COLEY

BY

Forest B. Hitchcock

HIS ATTORNEY

United States Patent Office 2,724,063

Patented Nov. 15, 1955

2,724,063

ELECTRO-MAGNETICALLY CONTROLLED START-STOP IMPULSE TIMER

Nelson B. Coley, Rochester, N. Y., assignor to General Railway Signal Company, Rochester, N. Y.

Original application April 13, 1950, Serial No. 155,720. Divided and this application November 18, 1952, Serial No. 321,259

14 Claims. (Cl. 310—39)

This invention relates to code oscillators of the torsional type, and more particularly pertains to code oscillators adapted to be released from a normal position to take a number of free oscillations to comprise a cycle of operation for a code type communication system.

This application is a division of my co-pending application, Ser. No. 155,720, filed April 13, 1950, and entitled Air Traffic Control Systems, now Patent No. 2,626,382, granted January 20, 1953.

In the parent application above mentioned, a code type communication system is disclosed in which an oscillator is located both at the sending station and at the receiving station. These two code oscillators are normally held in energized positions from which they are released when deenergized to operate through a number of free oscillations to comprise a cycle of operation for the communication system after which they are restored to their normally energized condition. These code oscillators in taking the free oscillations mark off the successive steps for the code communication system.

An object of the present invention is to provide a code oscillator of the torsional type which is adapted to operate in a system as above mentioned, and which will operate in an accurate and reliable manner through the required number of free oscillations.

Other objects, purposes and characteristic features of the present invention will be in part obvious from the accompanying drawings and in part pointed out as the description of the invention progresses.

In describing the invention, reference is made to the accompanying drawings, in which corresponding parts are designated by like reference characters, and in which—

The various circuit organizations are illustrated in a conventional schematic manner to more particularly facilitate an understanding of the mode of operation of the system rather than to attempt to point out the details of the construction and arrangement of components that may be provided by those skilled in the art in accordance with the requirements of practice. The symbols (+) and (−) have been used to indicate connections to the respective positive and negative terminals of suitable batteries or other sources of direct current.

The transmission and reception of messages in the system provided according to the invention shown and described in my above mentioned parent application is dependent upon code oscillators operating at corresponding rates at the respective transmitting and receiving stations. These oscillators are preferably of the torsional pendulum type of the general character, for example, disclosed in the patent to O. S. Field, No. 2,351,588, dated June 20, 1944. However, the oscillator according to the Field patent is adapted to be driven at a constant rate by the application of energy to its operating circuit which is arranged to energize its electromagnet for a limited period for each of its operating swings or oscillations so as to maintain its oscillations continuously at a uniform rate so long as energy is applied.

For the purpose of the present invention, however, it is considered desirable that the oscillator mechanism be normally inactive but retained in one of its extreme operated positions so that it can be started from a predetermined position when it is desired to initiate the stepping of the code communication apparatus. For this reason, the oscillator according to this invention has its winding normally steadily energized when the system is at rest; and upon setting the code communication system into operation, energy is removed from the electromagnet associated with the oscillator mechanism. The torsional pendulum of the oscillator is thus permitted to swing free in oscillations, the amplitude and periodicity of which is determined by the characteristics of a torsional involute spring, such as the spring 32 illustrated in Fig. 1, combined with the inertia of the pendulum 33 to obtain the desired frequency of oscillation.

Figures 1, 2, 3:
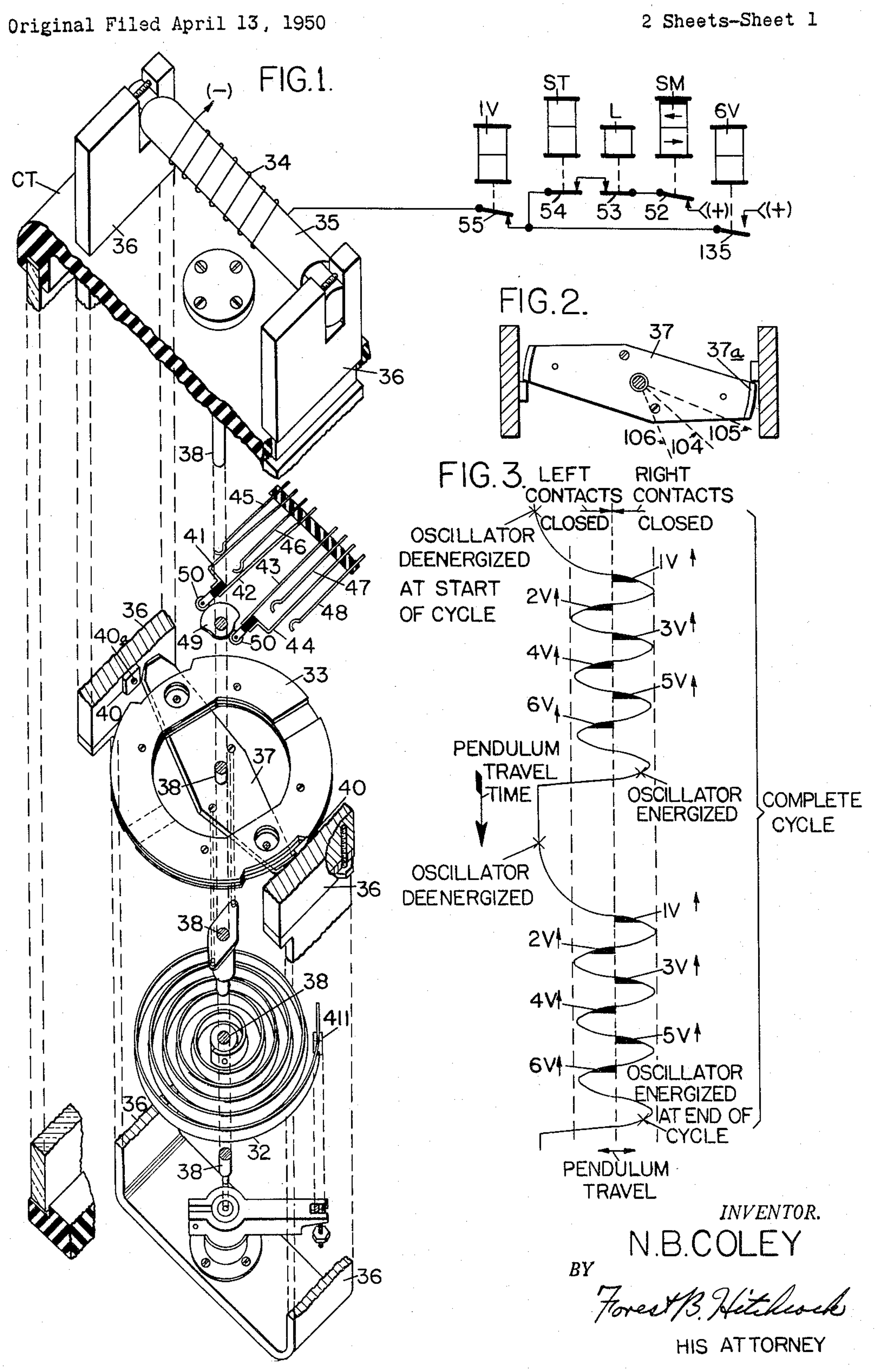
Fig. 1 illustrates somewhat diagrammatically and partly in perspective the general organization of a suitable code oscillator for use in the code communication system disclosed in the parent application above mentioned.
Fig. 2 is a plan view partially in cross section showing the position the armature of an oscillator assumes when the oscillator is energized and, illustrating diagrammatically the approximate limits of oscillation of the armature when it is allowed to swing free subsequent to deenergization of the oscillator electromagnet.
Fig. 3 is a diagram illustrating pendulum travel of an oscillator during a typical communication cycle.

According to the structure of the oscillator CT as is illustrated in Fig. 1, a winding 34 is provided on a core 35 of an electromagnet so as to set up a magnetic field through the vertical poles 36 of a U-shaped magnetic structure when the winding is energized, and through a centrally pivoted armature 37 which is disposed between the poles 36 and is secured to a central vertical shaft 38, which in turn is biased by the involute spring 32. The organization of the oscillator CT is thus such that the energization of the winding 34 of the electromagnet sets up a magnetic field through the armature 37 so as to urge the armature 37 in a position to align with the magnetic field extending through it between the two oppositely disposed poles 36 of the electromagnet.

Rather than permit the armature 37 to be drawn into full alignment with the poles 36, and in operation swing beyond this position because of the inertia of its associated pendulum 33, suitable stops 40, preferably of nonmagnetic material such as fiber, are secured to the inner surfaces of the poles 36 of the electromagnet by nonmagnetic rivets or screws 40*a* so as to limit the rotation of the armature 37 of the oscillator CT in response to energization of the associated electromagnet. Thus, when the electromagnet of the oscillator CT is energized, the armature 37 assumes a position as is illustrated in Figs. 1 and 2 wherein the field set up by the electromagnet urges the armature 37 against the stops 40 because the armature 37 is not permitted to rotate counter-clockwise to an extent required to become in perfect alignment with the shortest path for a magnetic field passing through the armature 37 between the respective poles 36. It is preferable that stops 40 be employed for both ends of the armature 37 so as to balance the stopping of the armature 37 with respect to the application of strain on the bearings of the shaft 38.

The pendulum 33 is secured to the armature 37 so as to be actuated by the torsional force applied by the involute spring 32 which has its inner end secured to the shaft 38 of the oscillator CT and has its outer end secured in a suitable adjustment clamp 411 so that adjustments in the spring tension may be made as required, to particularly balance the rates of oscillation of the code oscillators CT employed at the respective stations of a communication system.

It is well known that an oscillator of this character has a constant period of oscillation for the respective cycles of the oscillator, within certain limits of spring tension, when the oscillator is released from its energised position and allowed to oscillate back and forth solely because of the cooperation of the torsional spring and the inertia of the pendulum of the oscillator mechanism. The mode of operation of the oscillator CT in this respect will be hereinafter more particularly considered.

In accordance with the rotary oscillations of the oscillator CT, respective left movable contact fingers 41 and 42 and right movable contact fingers 43 and 44 are selectively opened and closed against cooperating fixed fingers 45, 46, 47 and 48 respectively by a suitable actuating cam 49 which is secured on the shaft 38. This cam 49 has been illustrated in Fig. 1 actuating rollers 50 associated with the respective left and right movable contact fingers. This cam 49 is so disposed on the shaft 38 that when the oscillator mechanism is deenergized and permitted to come to rest at a fixed neutral position with the center of the armature 37 aligned along the center line 104 (see Fig. 2), that the respective left and right hand edges of the cam 49 bear against the respective rollers 50 whereby a slight rotation of the shaft 38 is effective to close the left or right hand contacts dependent upon the direction of such rotation. Thus, by this adjustment, and by the contour of the cam 49 employed, the left hand contacts are maintained closed for the half of each period of oscillation to the left of the center line as viewed in Fig. 3, and the right hand contacts are closed for the half of each period of oscillation to the right of the center line as viewed in Fig. 3.

By this contact arrangement on the oscillator CT, it is provided that throughout each communication cycle of the system, the time of closure of the respective left and right contacts for each cycle of operation of the oscillator CT during its free swing subsequent to deenergization is of the same time duration. Thus, it can be said that the oscillator CT provides a series of alternate left and right contact closures constituting "on" periods of equal lengths for a series of cycles of the oscillator which can be used as standards governing the rate of code transmission and reception of the communication system. Such rate is constant, irrespective of voltage variations, because the rate is determined by a free swinging pendulum which is not influenced during its operation by electrical energization of its electromagnet.

Since this application is more particularly directed to the structural features of the code oscillator, no effort has been made to show the apparatus and circuits belonging to the complete code communication system. Reference may be made to the above mentioned parent application for details of such system. However, in order to show how the oscillator CT is normally energized, certain relays of the code communication system, such as at the central office have been shown in block form in Fig. 1. These relays include a series of stepping relays of which relay 1V and 6V have been shown, and all of which are normally deenergized.

A start relay ST is provided at each station for ensuring a proper start at that station which is to receive a control transmitted from the other station. This relay ST is normally energized through a stick circuit.

A line relay L is provided at each station for operating contacts in accordance with the then existing line circuit condition. The line circuit is normally energized.

A relay SM is provided at each station for governing the transmission of a message from that station. Thus, this relay SM is normally deenergized but is picked up at the transmitting station.

*Oscillator operation*

It has been pointed out that the code oscillators CT at the respective stations are both initiated at the beginning of a communication cycle by their respective deenergization, the oscillator CT at the transmitting station being initiated by the picking up of the relay SM, and the oscillator CT at the receiving station being initiated by the dropping away of the line relay L at that station. The oscillator CT at each station is therefore set into oscillatory motion at a rate determined by the mass of the pendulum 33 (see Fig. 1) in combination with the resiliency of the involute spring 32 by which the torsional pendulum 33 is driven.

With reference to Fig. 3, the oscillatory movement of a typical code oscillator CT is illustrated by a curve for a complete communication cycle of operation of the system, and it is indicated on this curve at what times respective stepping relays V of the stepping relay bank are energized. It is thus illustrated in Fig. 3 that the oscillators CT make four complete cycles of operation during each half of the communication cycle, the oscillators CT being momentarily energized at the midpoint in the communication cycle to permit the restoration of the relays of the stepping relay banks and permit the conditioning of the system for the answer back portion of the cycle. During this answer back portion of the cycle, the stepping proceeds as in the first half of the cycle in that there are four cycles of operation of the oscillator CT.

The diagram of pendulum travel of an oscillator CT according to Fig. 3 illustrates that some time is consumed in the initiation of the oscillator CT subsequent to its deenergization. This is obviously because of the time required for the flux in the electromagnet to decay and release its attraction of the armature of the oscillator against the stops 40 (see Fig. 1). Because of some retardation by the magnetic field under the above described condition, the armature 37 tends to accelerate slowly at the start and thus some of the torsional force of the pendulum 33 and spring 32 is dissipated so that the first excursion of the pendulum 33 will restore the armature 37 at an appreciable distance short of touching the stop 40 from which the armature 37 has been released at the beginning of the oscillation cycle (see Fig. 2). It has been found, however, that the oscillator CT will oscillate through four cycles of operation when once initiated without an appreciable variation in the extent of travel for each excursion, the times consumed for each of the four excursions being constant in accordance with the general principles of operation of torsional pendulums.

A preferred adjustment for the left and right contacts of the oscillator CT has been described. This adjustment provides that when the oscillator is set into free oscillations, the respective left and right contacts are respectively opened and closed in turn as the pendulum 33 swings through its center position of neutral bias. It is therefore provided that by the actuation of a suitable cam 49 (see Fig. 1) on the shaft 38 of the oscillator CT, respective left and right groups of contact fingers can be alternately opened and closed, with the closure time of each contact group being for the time of travel of the pendulum 33 from center to its extreme operation position and back again to center.

This center position is the position the armature 37 assumes when in alignment with its center line 104 as is illustrated in Fig. 2, and this is considered as the neutral position of the oscillator wherein there is no spring bias applied to rotate the pendulum 33 and the armature 37 in one direction or the other. Although the amount of travel of the armature 37 and the pendulum 33 during free swing oscillation will vary in accordance with the rate of coding as required according to different conditions to be encountered in practice, typical operating limits for the armature 37 are illustrated in Fig. 2 wherein the armature swings freely between the dotted lines 105 and 106 which indicate the approximate limits of swing to the respective sides of the center line 104.

Whenever the right-hand end **37*a* of the armature is above the center line 104 as viewed in Fig. 2, the left contact fingers 41 and 45, and 42 and 46 (see Fig. 2) are closed; and, similarly whenever the right-hand end 37*a* of the armature 37 is below the center line as viewed in Fig. 2, the above mentioned contact fingers are opened and the contact fingers 43 and 47, and 44 and 48** are closed.

With reference to Fig. 3, a curve is plotted of pendulum travel against time, and it will be readily understood that this curve is indicative of the travel of the contact actuating cam 49, the armature 37, or any other part secured to the shaft 38 to rotate therewith. It is illustrated in Fig. 3, that subsequent to the initiation of the oscillaor CT by the deenergization of its winding, the swing to each extreme position of operation for the first three cycles of operation of the oscillator is effective to pick up a stepping relay. Thus the relays for the odd numbered steps 1V, 3V, and 5V are picked up in response to the closure of the right-hand contacts of the oscillator CT as viewed in Fig. 3; and the actuation of the oscillator to its extreme positions in the other direction picks up the stepper relays 2V, 4V, and 6V for the even numbered steps. The respective pick up circuits for these stepping relays are closed as the operating mechanism of the oscillator CT passes through its center position 104 (see Fig. 2), and the times represented by the shaded areas on the curve according to Fig. 3 are representative of the pick up times of the respective stepping relays subsequent to their energization as the oscillator mechanism passes through its center position.

It is illustrated in the curve according to Fig. 3 that the extent of oscillation of the mechanism of the oscillator CT decreases only a small amount as the mechanism operates without energization through its respective cycles; but the times consumed in the respective cycles are always the same. Thus, the oscillator CT is effective by its free swinging operation to set up a fixed code rate wherein the times of closure of the respective left and right contacts for the respective cycles of operation of the oscillator CT are all of the same duration. The rates of the oscillators CT at the respective transmitting and receiving stations can be adjusted to be exactly the same, and thus the stepping will always be at the same rate at the respective stations, irrespective of voltage variations and other factors which could cause changes in rate if the oscillators CT were power driven for each of their oscillations.

Inasmuch as the rate of stepping is determined by the code oscillators CT, the adjustment of the oscillator code rate is necessarily made in accordance with the time of operation that is required for the stepping relays and other relays that must be operated successively during each step. It has been found that for one embodiment of the present invention, a code rate of approximately 630 pulses (or half cycles) per minute is satisfactory.

The relay 1V (see Fig. 1) at each station in dropping away at the end of a cycle of operation of the communication system provides for the energization of the oscillator CT at that station so as to actuate its armature 37 against the stops 40 and thus lock the armature in a position which has been described as normal for the oscillator CT, wherein the left-hand contact fingers 42 and 46, and 41 and 45 are maintained closed. When back contact 55 of relay 1V closes, the energizing circuit for winding 34 is closed first through front contact 135 and then through back contact 52, and front contacts 53 and 54. This energization of the oscillator CT at each station occurs at a time when the right-hand contact fingers 43 and 47, and 44 and 48 are closed for the fourth time during the second half of the communication cycle. Thus, the time of energization is such that a fourth excursion of the oscillator pendulum 33 is maintained by a substantially uniform motion providing a curve for the last excursion of a form as illustrated in Fig. 3, comparable to the curves for the other excursions of the communication cycle except that energization causes the armature 37 of the oscillator to be actuated against the stops 40 and thus to be drawn beyond the range of normal free swing oscillations to restore the armature 37 to its normal position.

Figures 4, 5, 6:
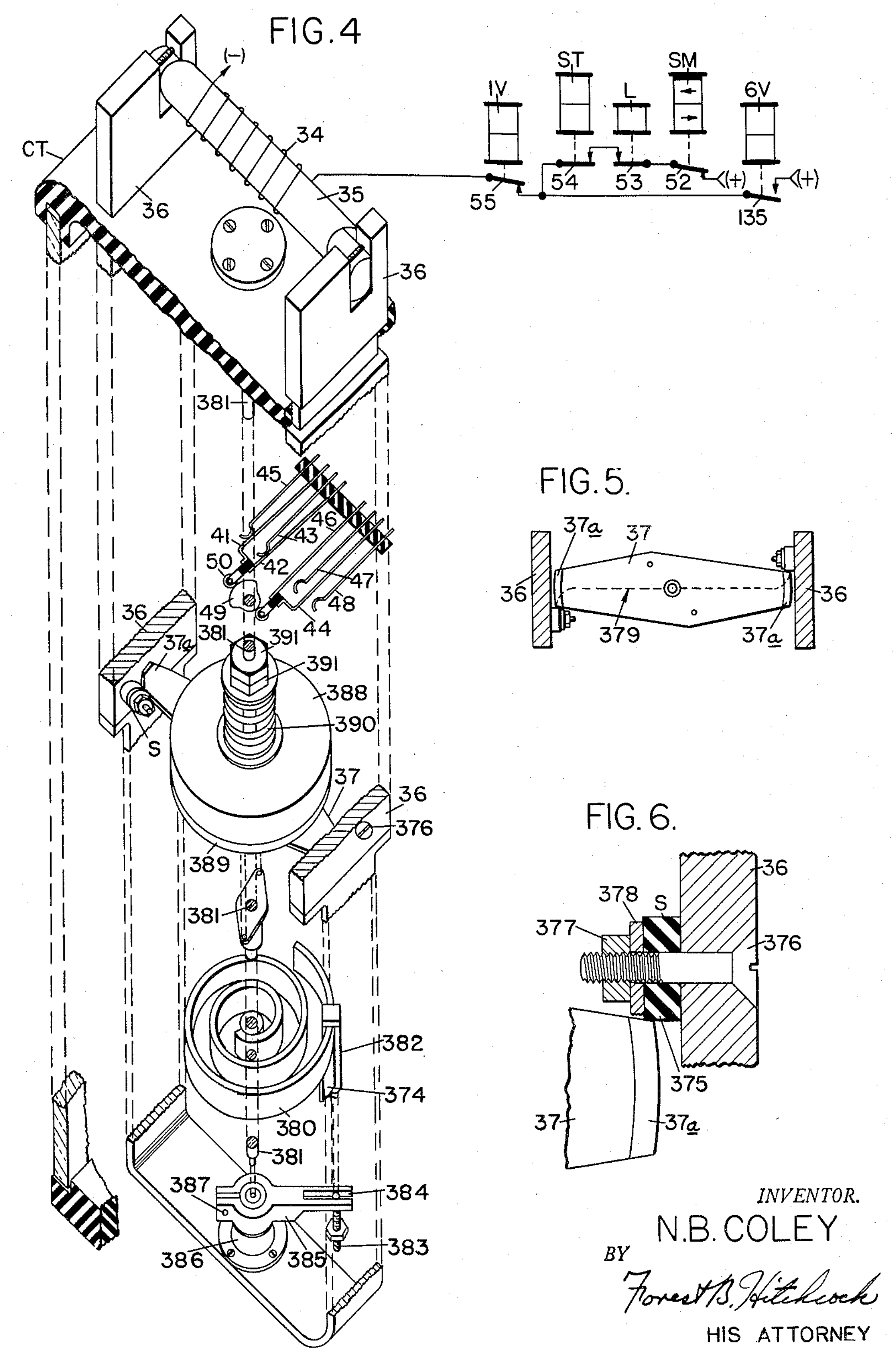
Fig. 4 illustrates somewhat diagrammatically and partly in perspective, the general organization of a modified form of the oscillator shown in Fig. 1.
Fig. 5 is a plan view, partly in cross section, showing the position the armature of the oscillator constructed according to Fig. 4 assumes when its windings are energized.
Fig. 6 is an enlarged sectional view of one of the stops of the oscillator shown in Fig. 4.

*Modified oscillator of Figs. 4, 5, and 6*

There are, of course, several modifications that may be made in the structure of the oscillators CT in accordance with the requirements of practice, and to illustrate certain of the modifications that may be desirable, reference is made to Figs. 4, 5, and 6. The oscillator CT disclosed in these Figs. 4, 5, and 6 has many parts in common with the oscillator disclosed in Fig. 1, and for this reason corresponding parts have been similarly designated to simplify the description of this modified form. For this reason, the present description will be directed more particularly to the modifications of the structure involving more particularly the structure of the stops employed in the code oscillator of the present invention.

The modification according to Fig. 4 involves principally the disposition and structure of the stops S which limit the movement of the armature 37 of the oscillator. Each of these stops S comprises a cylindrical bumper 375 of suitable nonmagnetic material, such as fiber, to be used as a bumper for the ends **37*a* of the armature 37. These bumpers 375 are secured to the inner surfaces of the respective pole pieces 36 by suitable screws 376 of magnetic material passing axially through the centers of the associated bumpers 375, with the bumpers 375 being secured firmly against the pole pieces 36 by nuts 377 threaded onto the screws 376. Each of the nuts 377 is drawn up against a washer 378 which is preferably of magnetic material and of a diameter just slightly less than the diameter of the associated bumper 375**.

By using stops of this structure, when the winding 34 of the oscillator CT is energized, a magnetic field is set up following a path of lowest reluctance as indicated by the dotted line 379 of Fig. 5 which extends axially through the magnetic screws 376 holding the bumpers 375 in place, the magnetic washers 378, the ends **37*a* of the armature 37 and along the center line of the armature 37**.

Thus, it will be seen that by the use of the magnetic cores 376 and magnetic washers 378 for the stops S, the magnetic field extending through the armature 37 is distorted at the ends of the armature so as to attract the armature with maximum efficiency in a manner to hold it in its locked up position. Therefore, the stops S, according to the oscillator illustrated in Figs. 4, 5, and 6 can be secured to the respective poles 36 at positions beyond the center line of the associated armature 37 when such armature assumes a position with its center line in correspondence with the shortest distance between the respective poles 36. It has been pointed out with reference to Fig. 1 that if the stops are of nonmagnetic material as is assumed in such Fig. 1, the stops should be so disposed that the center line of the armature 37 cannot be drawn in full alignment with the shortest distance between the poles 36, because of it being required that the flux of the magnetic structure maintain a torsional pull on the armature 37 so as to maintain the armature locked against its stops, and against the bias of the oscillator spring.

According to the modification shown in Figs. 4, 5, and 6, however, where the magnetic cores are used for the stops S, a distortion of the magnetic field between the respective poles 36 through the armature 37 is maintained, as compared to the shortest distance between these poles 36, by reason of the path of lowest reluctance for the magnetic field being distorted so as to follow the course that has been heretofore described, and that is indicated by the dotted line 379 of Fig. 5.

In the code oscillator illustrated in Fig. 4, an involute spring 380 of heavier material and shorter in length is employed for driving a shaft 381 to which the inner end of the spring is secured, the effective length of this spring being adjustable by a slotted bracket 382 which is in turn secured to an adjustment screw 383. The screw passes through a suitable radial slot 384 in the adjustment arm 385, which in turn is journaled on the lower bearing support 386 of the oscillator CT. This adjustment arm 385 is secured with respect to rotation after the adjustment position has been located by reason of a suitable set screw 387 passing through a bifurcated portion of the adjustment arm 385, thus causing the adjustment arm 385 to be locked with respect to rotation to the bearing support 386. The wedge 374 extends through the slotted bracket 382 beneath the spring 380 as a spacer to space the spring anchorage above the adjustment arm 385.

In accordance with the principle of torsional pendulum operation, a given rate of oscillation can be obtained either by use of a relatively stiff and short spring such as the spring 380 in combination with a heavy pendulum, or by a long relatively small spring such as the spring 32 of Fig. 1 and a relatively light pendulum as the pendulum 33. Thus, if a heavy spring such as the spring 380 is employed, the pendulum of the oscillator must be relatively heavy, and therefore the pendulum 388 of the oscillator shown in Fig. 4 is substantially heavier than the pendulum 33 shown in Fig. 1 to provide for the same rate of oscillation of the oscillator according to Fig. 4 as is accomplished by the oscillator according to Fig. 1.

Because of the pendulum 388 being substantially heavier than the pendulum 33 of Fig. 1, the inertia of the pendulum 388 is such as to set up excessive strain on the bearings of the oscillator and on the stops S and the cooperating armature 37, if this pendulum 388 were positively secured to the rotating shaft 381. Thus, the relatively heavy pendulum 388 cannot be positively secured to the shaft 381 but must be rotated through friction with a suitable friction plate 389, the friction plate 389 being positively secured to the oscillator shaft 381. The pendulum 388 is biased against the friction plate 389 by a suitable compression spring 390 which extends along the axis of the shaft 381 and is suitably maintained under compression by the adjustment and lock nuts 391 which are threaded onto the shaft 381. By this organization, it will be readily apparent that each time the oscillator CT is energized so as to attract the armature 37 against the respective stops S, the armature 37 upon striking these stops is stopped abruptly, but the friction engagement of the pendulum 388 with the friction plate 389 permits the pendulum 388 to slip with respect to the friction plate 389 and thus permit the inertia of the pendulum 388 to be absorbed upon locking of the armature 37 against the stops S, without excessive strain being applied to these stops, and to the bearings, shaft 381, and other parts of the oscillator CT.

It will be noted with reference to Fig. 6 that the magnetic washer 378 is made slightly smaller in diameter than the nonmagnetic bumper 375 so that the ends 37*a* of the armature 37 cannot directly contact the washer 378. Thus, there is no possibility of the armature 37 being held for a time in its locked up position, subsequent to the deenergization of the winding 34 of the oscillator, by reason of residual magnetism in the magnetic circuits of the oscillator.

Having thus described two specific forms of a code oscillator embodying the present invention, it is to be understood that these forms are more for the purpose of illustrating the principles of the present invention than to show the exact form thereof. It is to be understood that various modifications, adaptations, and alterations may be made to the specific forms shown in accordance with the requirements of practice, all within the scope of the present invention.

What I claim is:

1. A normally inactive code oscillator comprising, a torsional pendulum, a torsional spring biasing said pendulum to a center position with respect to rotation, a stop for limiting the extent of rotation of said pendulum in a particular direction, a magnetic armature disposed to rotate with said pendulum to an extent limited by said stop, and a normally energized electromagnetic structure effective when energized to actuate said armature to a normal position against said stop whereby the deenergization of said electromagnet sets said armature into a cycle of several free oscillations initiated from said normal position in contact with said stop.

2. A code oscillator comprising, a torsional pendulum and armature secured on a pivoted shaft, a torsional spring biasing said armature to a center position with respect to rotation, an electromagnetic structure effective when energized to actuate said armature in a given rotated direction from said center position, and a nonmagnetic stop having a magnetic center secured to said electromagnetic structure so disposed as to limit the extent of rotation of said armature from said center position upon the energization of the electromagnetic structure.

3. A code oscillator comprising in combination, a pivoted shaft having secured thereto a torsional pendulum and an armature, a torsional spring biasing said armature to a center position with respect to rotation, an electromagnetic structure effective when energized to actuate said armature in a particular direction of rotation from said center position, and two stops secured to said electromagnet structure and so disposed as to contact said armature substantially simultaneously at respective opposite positions with respect to the disposition of said armature on said shaft and thereby limit the extent of rotation of said armature upon the energization of said electromagnet structure.

4. A code oscillator comprising, a pivoted shaft having an armature and a torsional pendulum disposed thereon, the armature being secured to the shaft, and the pendulum being rotatively driven by reason of friction with a member that is rotatively secured to the shaft, a torsional spring rotatively biasing said shaft to a particular center position with respect to rotation, an electromagnet structure effective when energized to actuate said armature in a particular rotated direction from said center position, said electromagnetic structure having secured thereto oppositely disposed nonmagnetic stops with magnetic centers, said stops being so disposed as to limit the rotation of said armature by contacting that armature simultaneously at respective points spaced opposite from each other and spaced an equal distance from the point at which said armature is disposed on said shaft.

5. A code oscillator comprising, an electromagnet having two oppositely disposed magnetic pole pieces, a pivoted shaft disposed between said pole pieces, a torsional pendulum disposed on said shaft and rotatably secured thereto only by friction, a stop secured to each of said pole pieces, said stops being diametrically opposed to each other with respect to said shaft, a diametric armature secured on said shaft, said armature being rotatably attractable by energization of said electromagnet to a position contacting both of said stops simultaneously, and a torsional spring secured to said shaft biasing said armature away from said stops.

6. A code oscillator of the character described comprising an electromagnet having two oppositely disposed magnetic pole pieces, a pivoted shaft disposed midway between said pole pieces, a torsional pendulum disposed on said shaft and rotatably secured thereto only by friction, means for adjusting said friction coupling of said torsional pendulum to said shaft, a stop secured to each of said pole pieces, said stops being diametrically opposed to each other in a plane normal to the axis of said shaft, a diametric armature secured on said shaft normal to the axis thereof, said armature being rotatably attractable by energization of said electromagnet to a position contacting both of said stops simultaneously, and a torsional spring secured to said shaft biasing said armature away from said stops.

7. A code oscillator comprising, an electromagnet having two oppositely disposed magnetic pole pieces, a pivoted shaft disposed midway between said pole pieces, a friction plate secured on said shaft, a torsional pendulum disposed on said shaft and coupled thereto rotatively only by friction engagement with said friction plate, a compression spring extending axially with respect to said shaft urging said torsional pendulum in friction engagement with said plate, means for adjusting the compression of said spring, a stop secured to each of said pole pieces, said stops being diametrically opposed to each other normal to the axis of said shaft, a diametric armature secured on said shaft normal to the axis thereof, said armature being attractable by energization of said electromagnet to a position contacting both of said stops at opposite ends simultaneously, and a torsional spring secured to said shaft biasing said armature away from said stops.

8. A code oscillator comprising in combination, an electromagnet having two oppositely disposed magnetic pole pieces, a pivoted shaft disposed between said pole pieces having an axis normal to the magnetic field between said pole piece, a torsional pendulum disposed on said shaft and rotatably secured thereto only by friction, means for adjusting the degree of friction engagement of said torsional pendulum to said shaft, a stop secured to each of said pole pieces, said stops being diametrically opposed to each other in a plane normal to the axis of said shaft, a diametric armature secured on said shaft, said armature being rotatably attractable by energization of said electromagnet to a rotated position between said pole pieces contacting both of said stops simultaneously, a torsional spring secured to said shaft biasing said armature rotatably against said stops, and means for adjusting the tension of said torsional spring.

9. A normally inactive code oscillator comprising in combination, an electromagnet having oppositely disposed magnetic pole pieces, a free swinging pendulum disposed to swing between said pole pieces, said pendulum being biased away from said pole pieces, an armature disposed to swing with said pendulum, and a stop limiting movement of said armature when said armature is attracted to said pole pieces, whereby said armature is normally held against said stop by the energization of said electromagnet, but oscillates freely at a frequency governed by the weight of said pendulum for a number of free oscillations when said electromagnet is deenergized.

10. A normally inactive code oscillator effective when deenergized to operate through a succession of several free oscillations comprising in combination, an electromagnet having two oppositely disposed magnetic pole pieces, a free swinging pendulum disposed to swing between said pole pieces, said pendulum being biased away from said pole pieces, a magnetic armature disposed to swing with said pendulum, and stops disposed on said pole pieces for limiting the swing of said armature, said stops being so disposed as to contact opposite sides of said armature simultaneously when said armature is attracted by said electromagnet.

11. A code oscillator comprising, an electromagnet having two oppositely disposed magnetic pole pieces, a free swinging pendulum disposed to swing between said pole pieces, said pendulum being biased away from said pole pieces, an armature secured to swing operatively with said pendulum subject to attraction to a position between said pole pieces by the energization of said electromagnet, and stops disposed on said pole pieces for limiting the swing of said armature, said stops being so disposed as to contact opposite sides of said armature simultaneously when said armature is attracted by said electromagnet.

12. A code oscillator comprising, an electromagnet having two oppositely disposed magnetic pole pieces, a rotatable shaft disposed between said pole pieces having a diametric armature and a torsional pendulum secured thereto, a stop secured to each of said magnetic pole pieces, said stops being diametrically opposed to each other with respect to said shaft, whereby diametrically opposed points on said armature respectively contact said stops simultaneously when said electromagnet is energized, and a torsional spring biasing said shaft to a position with respect to rotation whereby said points of said armature are displaced from said stops.

13. A code oscillator comprising, an electromagnet having two oppositely disposed magnetic pole pieces, a rotatable shaft disposed between said pole pieces having a torsional pendulum secured thereto, a stop having a magnetic core secured to each of said magnetic poles, said stops being diametrically opposed to each other with respect to said shaft, a diametric armature secured on said shaft, said armature being rotatably attractable by energization of said electromagnet, and said armature being effective upon attraction by said electromagnet to contact both of said stops simultaneously, and a torsional spring secured to said shaft biasing said armature away from said stops.

14. A code oscillator comprising, an electromagnet having two oppositely disposed magnetic pole pieces, a pivoted shaft disposed between said pole pieces, a torsional pendulum secured on said shaft, a stop having a magnetic core secured to each of said magnetic pole pieces, a diametric armature secured on said shaft, said armature being rotatably attractable by energization of said electromagnet to a position normal to said pole pieces, said stops being disposed so as to simultaneously contact said armature when said armature is normal to said pole pieces, and a torsional spring secured to said shaft biasing said armature away from said stops.

References Cited in the file of this patent

UNITED STATES PATENTS

| | | |
|---|---|---|
| 1,087,556 | Sandell | Feb. 17, 1914 |
| 1,851,543 | Bossard | Mar. 29, 1932 |
| 2,000,585 | Fink | May 7, 1935 |
| 2,442,395 | Bramley | June 1, 1948 |

FOREIGN PATENTS

| | | |
|---|---|---|
| 78,486 | Sweden | Sept. 26, 1933 |